United States Patent [19]

Hayashi et al.

[11] 4,115,825

[45] Sep. 19, 1978

[54] TAPE LOADING APPARATUS IN A MAGNETIC RECORDING AND REPRODUCING APPARATUS

[75] Inventors: Yoshiaki Hayashi; Nobuyoshi Fujimori, both of Katano, Japan

[73] Assignee: Matsushita Electric Industrial Co., Ltd., Kadoma, Japan

[21] Appl. No.: 790,500

[22] Filed: Apr. 25, 1977

[30] Foreign Application Priority Data

May 4, 1976 [JP] Japan .................................. 51-51026

[51] Int. Cl.² ........................................ G11B 15/66
[52] U.S. Cl. ........................................ 360/85; 360/95
[58] Field of Search ......................... 360/85, 95, 132; 242/199-202, 207, 208; 226/196

[56] References Cited

U.S. PATENT DOCUMENTS

| | | | |
|---|---|---|---|
| 3,740,492 | 6/1973 | Inaga | 360/85 |
| 3,871,025 | 3/1975 | Nakamoto | 360/95 X |

FOREIGN PATENT DOCUMENTS 44-20674  4/1969  Japan .......................... 360/95

OTHER PUBLICATIONS

IBM Technical Disclosure Bulletin, vol. 13, No. 10, Mar. 1971, p. 3075.

Primary Examiner—John H. Wolff
Attorney, Agent, or Firm—Stevens, Davis, Miller & Mosher

[57] ABSTRACT

Disclosed is a magnetic tape recording and reproducing apparatus or video tape recorder apparatus in which a magnetic tape is drawn out from a tape cassette by means of tape lead-out pins and brought into close contact with a head cylinder containing rotating heads. Each of the tape lead-out pins is mounted on a movable base having an engaging member which is adapted to bear against a first stopper for defining a limit of the tape lead-out movement of the movable base in the horizontal direction, while the movements of the movable base in the vertical direction are limited by a second stopper and lateral movements of the base are restricted by a third stopper, whereby the movable bases each having a tape lead-out pin are positively constrained at predetermined positions after the tape has been drawn out from the tape cassette.

12 Claims, 20 Drawing Figures

TAPE LOADING APPARATUS IN A MAGNETIC RECORDING AND REPRODUCING APPARATUS

This invention relates in general to a magnetic recording and reproducing apparatus such as a video tape recorder (hereinafter referred to as recorder of the helical scanning type) in which a magnetic tape contained in a tape cassette is drawn out and wound helically around a head cylinder over a predetermined angular distance, the head cylinder containing a plurality of rotating heads. In particular, the invention concerns the structure of such a recorder apparatus in which the magnetic tape is adapted to be automatically led out from the tape cassette set in the apparatus and automatically loaded on various mechanisms constituting the recording and reproducing portions of the recorder.

In a recorder apparatus of the helical scanning type, it is required that the magnetic tape, as it is drawn out from the tape cassette, be precisely wound around the head cylinder which is inclined at a predetermined angle. To this end, the locations as well as inclinations of guide posts positioned at the inlet and exit sites of the magnetic tape relative to the head cylinder must be carefully and accurately determined.

Recently, there have been developed VTR apparatus in which the magnetic tape is automatically led out from the tape cassette and wound around the head cylinder with the aid of tape lead-out pins. When these pins are intended to be used as the tape guide posts after the tape has been loaded, they must be fixedly held precisely at respective predetermined positions.

An object of the invention is to provide a magnetic tape recording and reproducing apparatus in which the tape lead-out pins serving for both leading out the magnetic tape from a tape cassette set in the apparatus and subsequently guiding the thus loaded magnetic tape can be positively and fixedly held precisely at predetermined guide positions without any movement in any direction.

With the above object in view, there is provided according to one aspect of the present invention, a magnetic recording and reproducing apparatus of the rotating head type comprising a base plate, a head cylinder of cylindrical shape mounted on the base plate and containing rotating heads, movable bases mounted on the base plate on each side of the head cylinder so as to be movable, respectively, between first positions adjacent to the head cylinder and second positions adjacent to a loaded magnetic tape cassette, tape lead-out pins each mounted on each of the movable bases, driving means for moving the movable bases between the first and second positions, first stopper means adapted to engage with the movable bases (or alternatively first members mounted respectively on the movable bases) thereby to limit the movements of the movable bases at the first position, second stopper means adapted to engage with the movable bases (or alternatively second members mounted on the movable bases) thereby to prevent movement of the movable bases in directions substantially perpendicular to the plane of the base plate at the first positions, and third stopper means adapted to engage with the movable bases (or alternatively third members mounted on the movable bases) at the first position thereby to prevent movements of the movable bases in lateral directions substantially perpendicular to the moving directions of the movable base.

The above and other objects, features and advantages of the invention will become more apparent from detailed description of preferred embodiments of the invention taken in conjunction with the accompanying drawings, in which.

Figure 1:
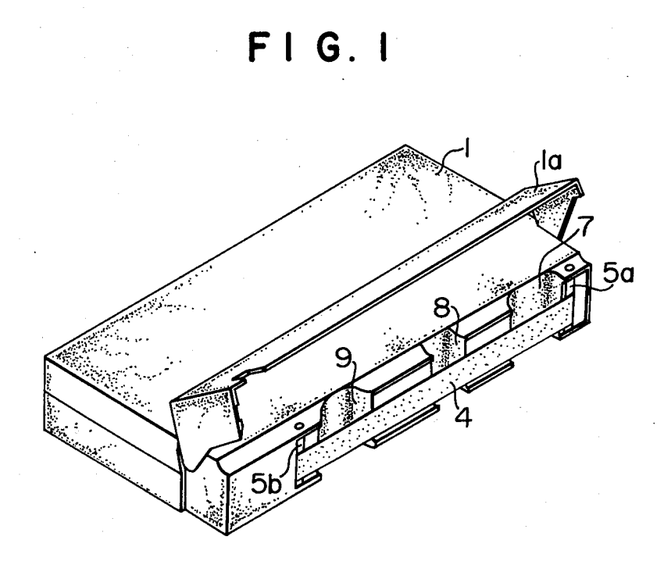
FIG. 1 is a perspective view showing schematically an example of a magnetic tape cassette employed in a magnetic recording and reproducing apparatus or VTR apparatus according to the present invention.
Figure 2:
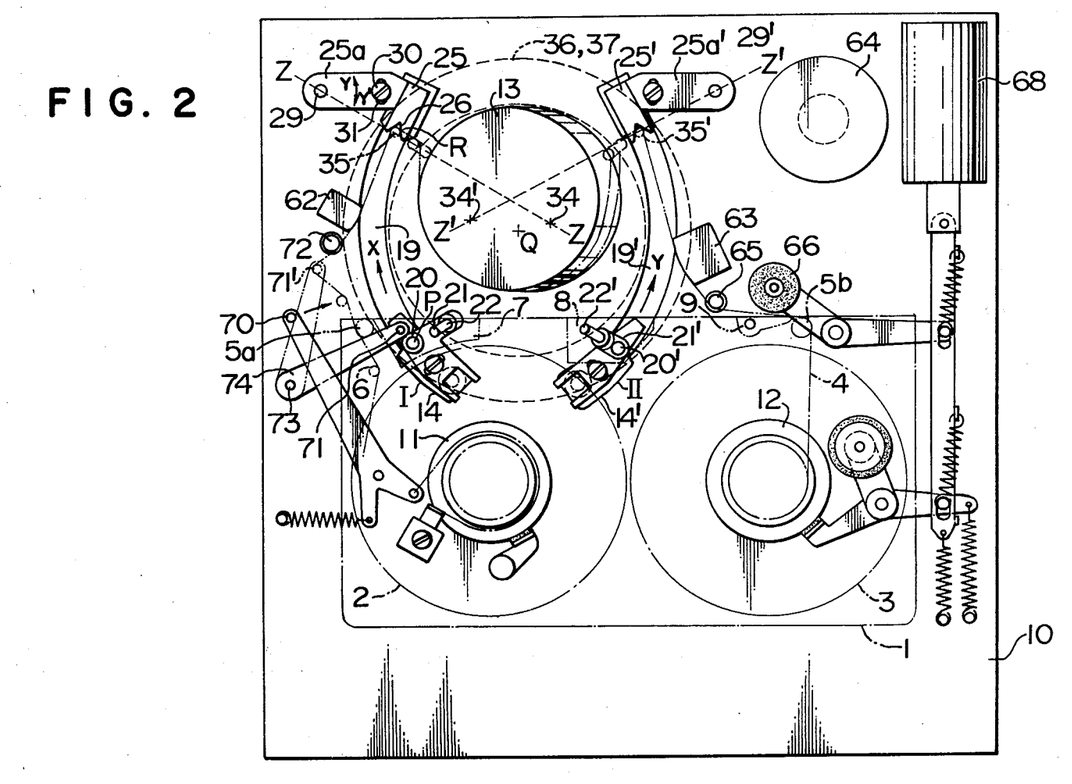
FIG. 2 is a top plan view showing an embodiment of a magnetic recording and reproducing apparatus according to the invention in a state before the magnetic tape is loaded.

Referring to FIGS. 1 and 2 which show a tape cassette to be employed in a magnetic recording and reproducing apparatus such as a magnetic tape recorder a tape cassette body 1 accommodating therein a tape supply reel 2 and a winding reel 3 on which is loaded a magnetic tape 4 suspended under tension through guide posts 6, 5a and 5b. The tape 4 is partially exposed to the exterior through an opening window portion formed in the cassette body in one lateral side thereof. There are formed in the window or open portion notches 7 and 8 for accommodating therein tape lead-out pins or the like and a concave notch 9 for receiving therein a capstan. The notches 7, 8 and 9 will also be described hereinbelow. The magnetic tape 4 extends transversely across these notches 7, 8 and 9 under tension. When the tape cassette is not used, the window or opening portion is covered by a cover member 1a which is pivotally mounted on the cassette body 1 so as to expose partially the magnetic tape 4 when the cassette is loaded in the recorder in a manner such as shown in FIG. 1.

Referring to FIG. 2 which shows a magnetic tape recorder according to the present invention in a top plan view with the top cover removed, the aforementioned cassette body 1 is loaded on a base plate 10 in a predetermined position with the supply reel 2 fitted on a supply reel supporting member 11 and the winding-on reel 3 fitted on an associated supporting member 12. Reference numeral 62 denotes an erase head; 63, a head for a control signal and an audio signal; 64, an electric motor for a capstan 65; and 66, a pinch roller. Numerals I and II denote generally a pair of magnetic tape lead-out mechanisms or assemblies for leading out a magnetic tape 4 from the cassette 1 and for winding it around a head cylinder 13 which is mounted on the supporting base plate 10 in an inclined position.

Figure 6:
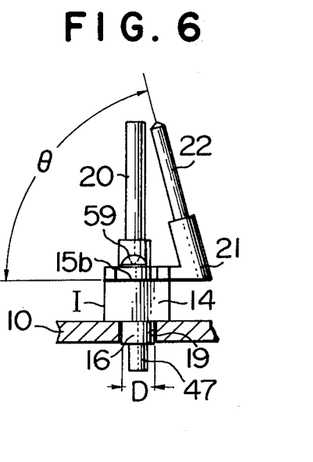
FIG. 6 is a front view of the same with a portion shown in section.
Figure 7:
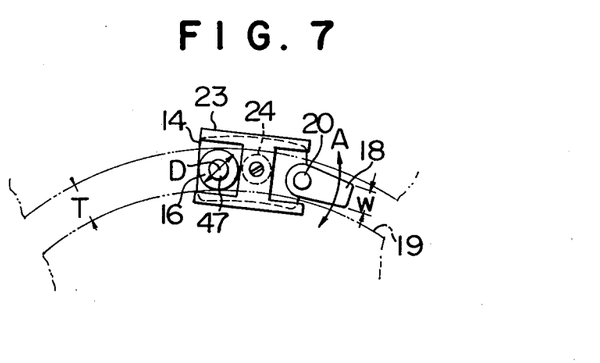
FIG. 7 is a bottom plan view of the same.

The construction of the tape lead-out mechanism I will be described in detail with reference to FIGS. 4, 5, 6, 7 and 8. Reference numeral 14 denotes a base portion of the tape lead-out assembly, which base has two smooth faces 15a and 15b in parallel with each other. On the smooth surface 15a there is provided a hub 16 having a diameter D and a pin 47. Mounted on the smooth surface 15a of the base portion 14 at one end thereof is a projecting piece 18 having a flat face 17 substantially flush with the plane of the flat surface 15a. The flat face 17 may be lower than the flat surface 15a at a distance indicated by $t$ in FIG. 5. In the illustrated embodiment, the tolerance $t$ is in the range of 0.02 to 0.05 mm and may vary depending upon the precision required in a practical apparatus. The width W of the projecting piece 18 is selected to be narrower than the width T of a guide groove 19 provided in the base plate 10. In the case of the embodiment illustrated in FIG. 2, the guide groove is of arcuate shape having a predetermined radius. It is, however, noted that the configuration of the guide groove is not restricted to such arcuate shape but my be a segment having a parabolic shape or any other shape so that the groove 19 extends from the notched portion 7 of the loaded tape cassette 1 and passes by a side portion of the head cylinder 13. The width T of the groove is selected substantially equal to the diameter D of the hub 16 so that the latter is slidably engaged in the former, as shown in FIG. 6. In this manner, the base portion 14 of the lead-out assembly can be slidably guided on the base plate 10 along the guide groove 19. Further, because the width W of the projecting piece 18 is smaller than the width T of the guide groove 19 while the latter is substantially equal to the diameter D of the hub, the base portion 14 can be pivoted to some degree about the hub 16 in the direction indicated by arrow A—A', as is shown in FIG. 7. A vertical pin 20 is anchored in the base portion 14 perpendicular to the flat and smooth face 15a and projects for a short distance from the face 15a and for a longer distance from the flat surface 15b. The vertical pin 20 engages the magnetic tape 4 in the cassette 1, and after the tape has been led out of the cassette, the pin 20 functions as a guide pin for defining the running path of the tape 4. Reference numeral 21 denotes the fitting portion of a correcting post 22 inclined at a predetermined angle $\theta$ relative to the flat surface 15b. The fitting portion is fixedly secured on the flat or smooth face 15b of the base portion 14 by means of a screw 59 so that the axis of the post 22 intersects that of the upstanding pin 20. The screw 59 is received in a mounting aperture slot 60 which is elongated in the transversal direction of the guide groove 19, as can be seen from FIG. 4. With such arrangement, when the screw 59 is loosened, it is possible to make the base fitting portion 21 of the correcting post 22 pivot around the vertical lead-out pin within a limited angular distance in the direction indicated by arrows B—B', thereby providing a fine adjustment for positioning the correcting post 22.

Figure 5:
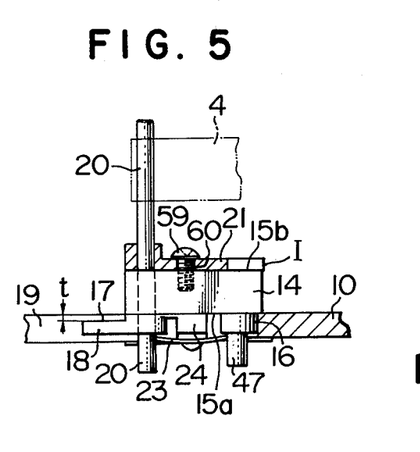
FIG. 5 is a side view of the tape leading-out mechanism shown in FIG. 4 with a portion shown in section.
Figure 8:
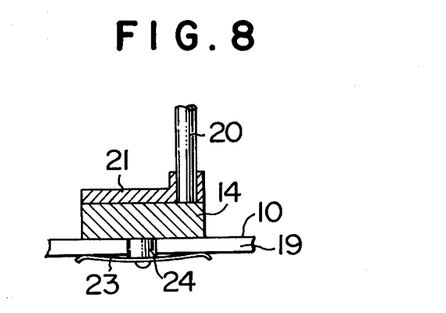
FIG. 8 shows the same in a side view with some portions shown in section.
Figure 9A:
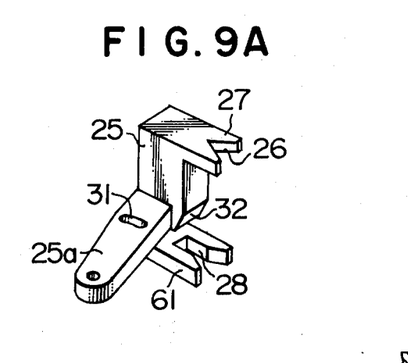
FIG. 9A is a perspective view of a stopper means employed in an embodiment of a magnetic recording and reproducing apparatus according to the present invention.
Figure 9B:
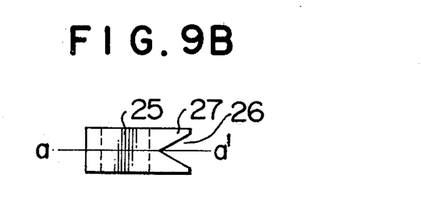
FIG. 9B is a top plan view of the same with a portion being broken away.
Figure 9C:
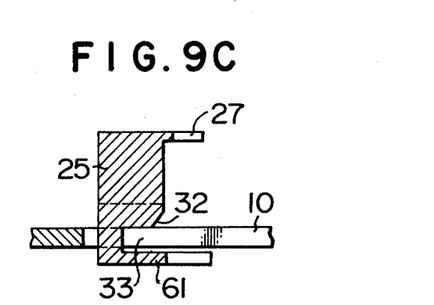
FIG. 9C is a side view of the same with some portions shown in section.
Figure 9D:
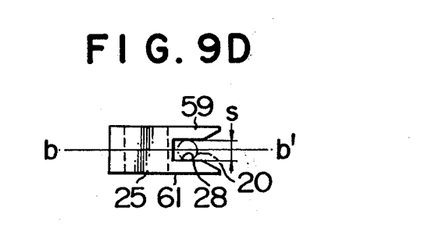
FIG. 9D is a bottom plan view of the same with some parts being omitted.
Figure 10:
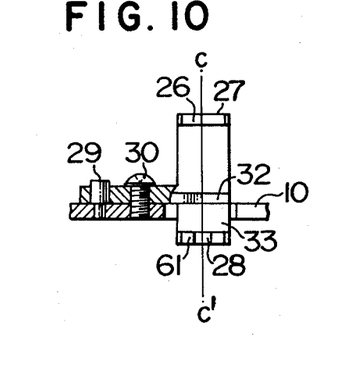
FIG. 10 shows a front view of the stopper means mounted on a base plate of a magnetic recording and reproducing apparatus with some portions broken away.

A leaf spring 23 having a forked end portion is mounted on a seat 24 provided on the flat surface 15a of the tape lead-out base portion 14 in the manner shown in FIGS. 5, 7 and 8 and causes the smooth face 15a of the base portion 14 to abut against the top surface of the base plate 10 under resilient pressure and to prevent the base portion 14 from being disengaged from the guide groove 19.

In the foregoing, the construction of the tape lead-out mechanism I has been described. It should be noted that the tape lead-out mechanism II has the same structure as the mechanism I except that the geometrical arrangement of the components and parts constituting the tape lead-out mechanism II is symmetrical to that of the above described mechanism I with respect to a center line extending therebetween, as can be seen in FIG. 2, and that a correcting post 22' is inclined outwardly from a vertical pin 20'. In other points the structure of the tape lead-out mechanism or assembly II is substantially the same as that of the mechanism I and therefore a detailed description thereof is unnecessary. For a better understanding of the mechanism II, like reference numerals each with a prime designate corresponding components or parts to that in the mechanism I.

The position of the tape lead-out mechanisms I and II after the magnetic tape 4 has been pulled out of the cassette 1 are limited by associated stoppers 25 and 25'. Since these stopper 25 and 25' are also of the same structure except for the symmetrical arrangement thereof, a detailed description will be provided only for the stopper 25 by referring to FIGS. 2, 9A to 9D, and 10.

Figure 11:
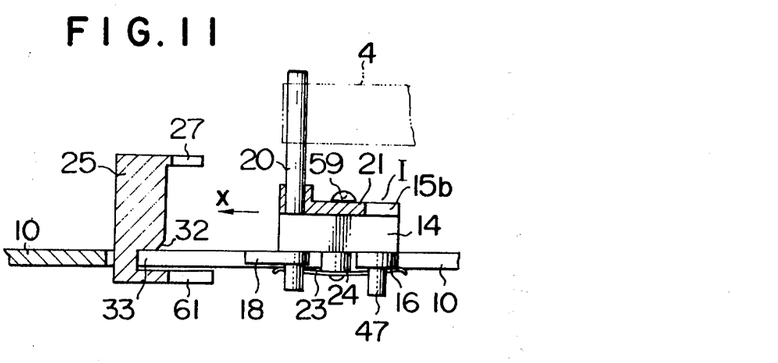
FIG. 11 is a partial sectional side view of the tape lead-out mechanism and the stopper means to illustrate relations existing therebetween.

As can be seen from these drawings, the stopper 25 is composed of a pair of forwardly projecting plates 27 and 61 disposed in parallel and in opposition to each other. The upper projecting plate 27 is formed with a V-like notch 26, while the lower projecting plate 28 is formed with a U-like notch 61. The disposition of these plates 27 and 61 is made in such way that the axial line $c—c'$ crossing through the center lines $a—a'$ and $b—b'$ of the V- and U-like notches 26 and 28 extends perpendicular to the upper surface of the base plate 10, as can be seen from FIGS. 9B, 9D and 10. The width S of the U-like notch 28 is substantially equal to the diameter of the vertical pin 20 described herein before so that the pin 20 may be received in the U-like notch 28, as indicated by the broken line in FIG. 9D. The stopper 25 is mounted on the base plate 10 through a mounting arm 25a so as to be pivotable around a stud 29 and is adapted to be fixedly secured at a predetermined position by a screw 30 through an elongated slot 31 formed in the arm plate 25a. The stopper 25 mounted on the base plate 10 may be pivoted about the stud 29 to some degree in the direction Y—Y' (FIG. 2). The stopper 25 has an inclined guide surface 32 which serves as a guide for guiding the projecting piece 18 formed in the base portion 14 of the tape lead-out mechanism I into a position where the projecting piece 18 is engaged in a recess 33 formed in the stopper 25, when the base portion 14 has moved in the direction denoted by X during the tape lead-out operation thereof, as is shown in FIG. 11. Since the structure of the stopper 25' is symmetrical to the stopper 25, further description of the stopper 25' is not needed. The components of the stopper 25' corresponding to those of stopper 25 are denoted by like reference numerals each attached to a prime. In this connection, it is to be noted that the guide grooves 19 and 19' of the tape lead-out assemblies I and II have, respectively, a predetermined curvature having center points 34 and 34', and that the studs 29, 29' for pivotably attaching the mounting arms 25a, 25a' of the stopper 25 or 25' are respectively positioned on lines z—z and z'—z' passing through the above mentioned respective center points 34, 34' and each of the center positions 35, 35' of the tape lead-out pins 20, 20' when they are stationary engaged in the V-like notchs 26, 26' of the stoppers 25, or 25'. In practice, it is required to adjust the positions of the stoppers 25 and 25' to some degree in either direction when the running path of the magnetic tape 4 and particularly, the envelope thereof is to be adjusted. To the end, the centers of the V-like notches 26 and 26' may ideally be adjusted in their positions along the curvatures of the grooves 19 and 19' during the adjustment of the stopper 25 and 25'. However, such procedure is not suitable for mass production of the apparatus. Alternatively, it is proposed that the stoppers 25 and 25' be pivottably adjustable about the mounting studs 29 and 29' so as to give substantially the same effect as if they were displaced along the curvature of the guide grooves 19 and 19'. The degree of adjustment is within an extremely limited rotation range, since, in practice, the adjustable range of the stopper 25 and 25' about the stud 29 or 29' is on the order of 1 mm.

Figure 13:
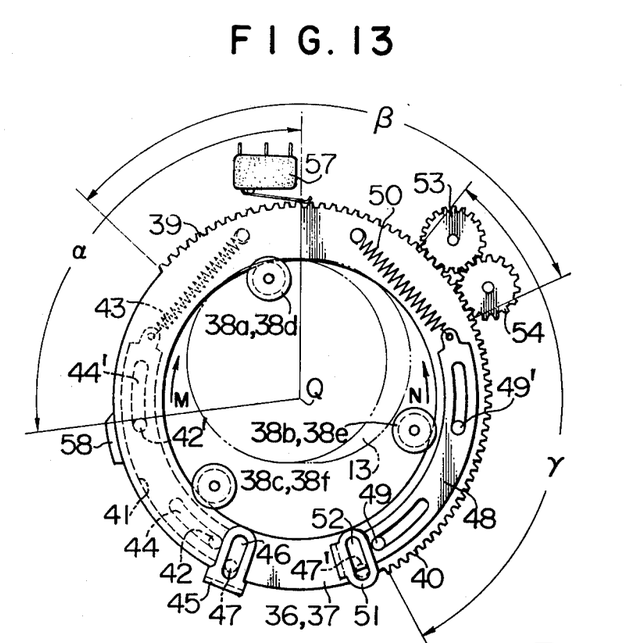
FIG. 13 is a plan view showing a main portion of a magnetic recording and reproducing apparatus in accordance with an embodiment of the present invention.
Figures 14, 15:
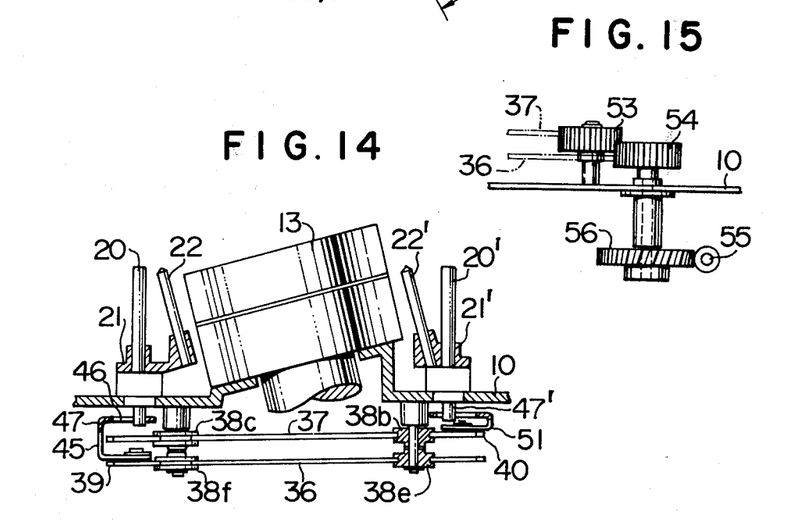
FIG. 14 is a partially sectioned side view of the same.
FIG. 15 is a fragmental side view showing a portion of the structure shown in FIG. 13.

Referring to FIGS. 13 and 14 in combination with FIG. 2, reference numerals 37 and 36 indicate rotatable tape loading rings or disks coaxially disposed together in a superposed relation below the base plate 10 by means of associated rollers 38a, 38b, 38c, 38d, 38e and 38f. Each of the loading rings 37 and 36 is formed with gear teeth 39 and 40 in the peripheral portions thereof over predetermined angular ranges of $\beta$ and $\gamma$, respectively. The loading ring 36 is provided with a slide member 41 which is slidably moved in the longitudinal direction as guided by guides pins 42 and 42' anchored on the ring 36 and received in engaging slots 44 and 44', respectively, which slots 44 and 44' are formed in the slide member 41. The member 41 is usually biased in the direction indicated by arrow M by means of a tension spring 43 connected to one end thereof. At the other end, the slide member 41 is provided with a bent portion 45 which is formed with an elongated slot 46 of a sufficiently large width to allow a slidable engagement with the pin 47 provided in the hub portion 16 of the tape lead-out assembly I. The elongated slot 46 is required to compensate for the difference between the rotating path of the loading ring 36 and the sliding path of the tape lead-out mechanism I. In this connection, it will be appreciated that the slot 46 and the guide pin 47 may be provided in the reversed relation, i.e., the former may be formed in the loading ring 36, while the latter may be mounted on the slide member 41.

In a similar manner, the loading ring 37 is provided with a slide member 48 adapted to be guided by means of pins 49 and 49' received in associated slots and urged in the direction N by means of a tension spring 50. As in the case of the slide member 41, the member 48 is provided with a bent portion 51 which is formed with an elongated slot 52 having a sufficient large width to allow a slidable engagement with the pin 47' provided in the hub portion 16' of the tape lead-out mechanism II.

Reference numeral 53 denotes a spur gear meshed with the toothed peripheral portion 39 of the loading ring or disk 37. Another spur gear 54 is engaged with both the spur gear 53 and the toothed peripheral portion 40 of the loading ring or disk and adapted to be rotated by a loading motor (not shown) by way of a worm 55 and a worm gear 56 shown in FIG. 15. In more detail the arrangement is such that the loading rings or disks 36 and 37 are rotated in opposite directions upon the rotation of the loading motor in either direction. Referring to FIG. 13, a limit switch 57 is provide for terminating the loading operation. In more detail, the switch 57 is adapted to engage with a cam portion 58 formed in the loading ring 36 at the end of the rotation of the loading rings 36 and 37 over respective predetermined angular ranges, thereby interrupting a power supply to the loading motor to stop rotation of the loading rings 36 and 37.

The tape loading operation of the above-described apparatus will now be described. When a tape cassette such as shown in FIG. 1 is loaded in a magnetic tape recorder having the above-mentioned structure, the cassete is lowered into the body of the recorder by means of an elevation mechanism, which itself is known to those skilled in the art, to such a position that the vertical tape lead-leadingout pins 20 and 20' as well as correcting posts 22 and 22' may be received in the notched recesses 7 and 8 formed in the tape cassette body 1. The capstan 65 is received in the notched recess 9. Refer to FIG. 2. In this manner, the tape lead-out mechanisms I and II come to positions in which they engage with the loading rings 36 and 37, as shown in FIG. 2. The rotation angle $\alpha$ of each of the loading rings 36 and 37, which angle is attained when the cam portion 58 has come to the position to actuate the limit switch, is selected to be greater than the angle $\angle$ PQR, where P is the geometrical center point of the vertical pin 20 or 20' located in the notched recesses 7 and 8 formed in the tape cassette, as is shown by the solid line in FIG. 2, Q is the common center of the rotation of the loading rings 36 and 37, and R is the geometrical center position of the upstanding pin 20 or 20' stationarily engaged in the V-like recesses 26 or 26' of the stopper 25 or 25' which are represented by broken lines 35 and 35' in FIG. 2.

Figure 3:
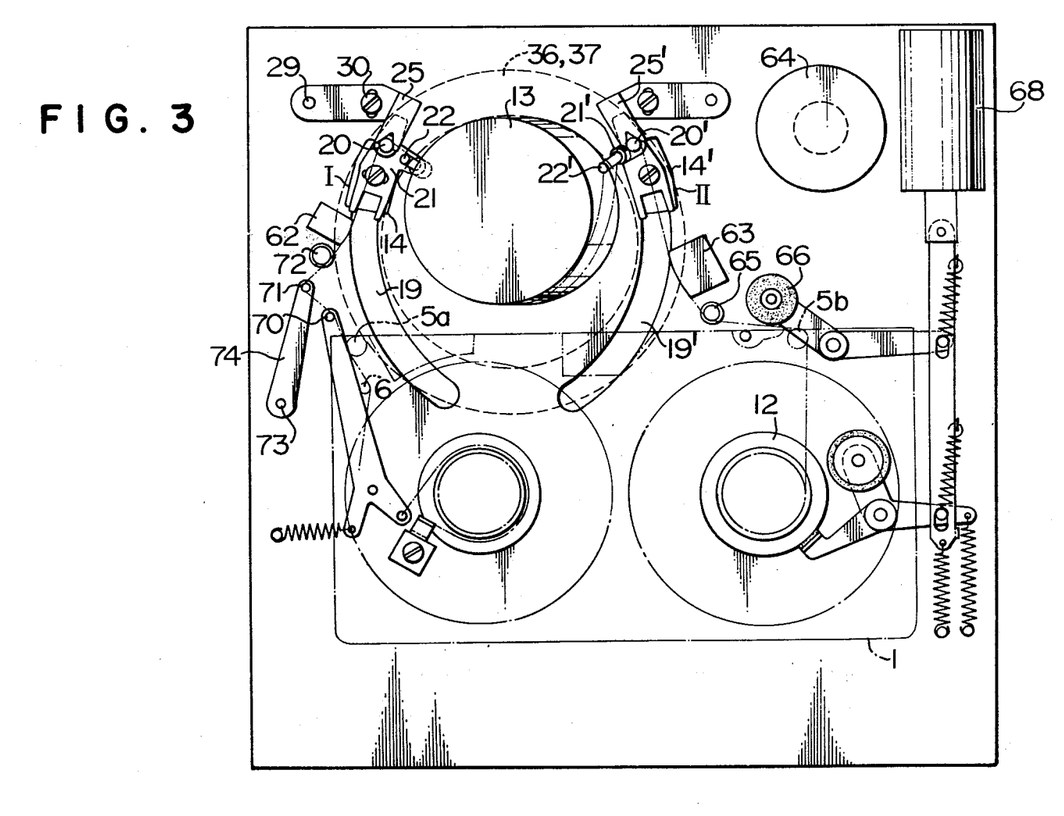
FIG. 3 is a similar view to FIG. 2 and shows the same in a state after the tape cassette has been loaded.
Figure 4:
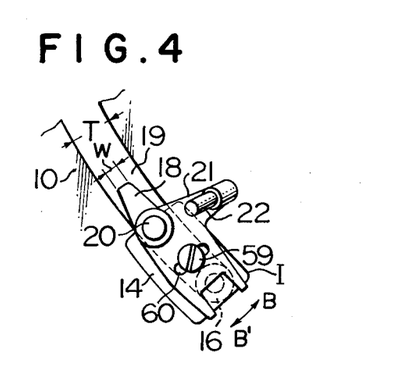
FIG. 4 is a top plan view of a tape lead-out mechanism of a magnetic recording and reproducing apparatus shown in FIGS. 1 to 3.

In the reproduction mode, when an associated push button (not shown) is pressed down, the loading motor is energized to start the rotation of the loading rings 36 and 37 in the clockwise and counter-clockwise directions, respectively, as the result of which the tape lead-out mechanism I is slidably moved along the guide groove 19 in the direction X, while the tape lead-out mechanism II is guided by the groove 19' in the direction Y. In the meantime, the magnetic tape 4 is drawn out from the cassette 1 by means of the vertical lead-out pins 20 and 20' as well as the correcting posts 22 and 22' and contact is made with the peripheral surface of the head cylinder 13. When the tape lead-out pins have attained the position where they are engaged in the V-like notches 26 and 26' as well as the U-like notches 28 and 28' of the associated stoppers 25 and 25', as shown in FIG. 3, the accompanying rotational movements of the sliding members 41 and 48 mounted on the loading rings 36 and 37, respectively, are stopped, and thereafter only the loading rings 36 and 37 are permitted to rotate until the cam 58 actuates the limit switch 57 thereby terminating the lead-out operation. During this phase of operation, the tension springs 43 and 50 are resiliently expanded as the loading rings 36 and 37 are rotated, whereby the restoring forces of the thus distorted springs 43 and 50 will press the vertical pins 20 and 20' against the V-like grooves 26 and 26' of the stoppers through the slide members 41 and 48. In this manner, the vertical pins 20 and 20' are securely held against the V-like grooves 26 and 26' of the stoppers 25 and 25' under the resilient forces of the tension springs 43 and 50. In this state, the loading motor is deenergized and the loading rings 36 and 37 will stop at the attained positions without being returned to the original position, because of the provision of the worm 55 and worm gear 56 meshed with each other. Subsequently, a plunger 68 is actuated to press the idler roll 66 to the capstan 65 thereby causing the magnetic tape 4 to run for the reproducing operation.

It should be mentioned here that the head cylinder 13 is inclined relative to a vertical line perpendicular to the plane of the base plate 10 at an angle equal to the angle of the correcting posts 22 and 22' inclined relative to the same vertical line so that the magnetic tape 4 supplied from the source reel 2 and wound around the winding reel 3 is perfectly contacted closely with the peripheral surface of the rotating head cylinder. As will be seen from FIG. 3, when the loading of the magnetic tape 4 has been completed, the magnetic tape 4 runs from the supply reel 2 to the winding reel 3 by way of the guide posts 6 and 5a, a tape tensioning pin 70, an auxiliary lead-out pin 71, a stationary pin 72, the erasing head 62, the vertical pin 20, the correcting post 22, the rotating head cylinder 13, the correcting post 22', the other pin 20', the head 63 for control and audio signals, the capstan 65 and the guide post 5b. The tape is eventually wound on the winding reel 3.

When the magnetic tape 4 is led out from the cassette 1, the vertical pins 20 and 20' as well as the correcting pins 22 and 22' will serve as the guide pins for sliding the tape 4 from the cassette 1 and then serve as the positioning pins for ensuring that contact is made by the magnetic tape 4 with the peripheral surface of the head cylinder 13, when the pins are pressed against the stoppers 25 and 25'. Through these pins 20, 20' and posts 22, 22' of the tape lead-out mechanisms I and II are driven by the annular loading rings 36 and 37 to lead out the magnetic tape 4, it will be appreciated that the curvature of the moving path, which corresponds to that of the guide groove 19 or 19' for the magnetic tape leading-out mechanisms I and II, is not required to coincide with the curvature of the loading ring 36 or 37 due to elongated slots 46, 52 provided in the bent portions 45, 51. Thus, according to the teaching of the present invention, a ring of a small diameter can be employed for the loading rings 36 and 37. Additionally, when it is compared with the hitherto known arrangement in which the tape lead-out assemblies I and II are rotated by means of rotating arms, the use of the loading rings as in the case of the illustrated embodiment of the present invention allows other mechanisms required in the recorder to be installed in space available at the center portion of the loading rings, which advantageously leads to a miniaturization of the overall size or dimension of the recorder. Furthermore, the arrangement is such that the pair of loading rings 36 and 37 are driven by a single loading motor through a pair of meshed spur gears 53 and 54, thus the paired loading rings 36 and 37 can be rotated at an equal speed in the opposite directions with a simplified driving structure.

Referring to FIG. 2, the auxiliary tape lead-out pin 71 is anchored to a rotatable arm 74 which is adapted to be swung about a stud 73 through a suitable driving means (not shown). Upon inserting the tape cassette 1, the pin 71 is positioned at the notched recess 7 of the cassette 1 and adapted to be rotated for a predetermined angular distance during the tape loading operation (FIG. 2) thereby assuring close contact of the magnetic tape 4 with the erasing head 62.

The tension pin 70 is mounted on a tension arm 76 pivoted about a stud 75. Before the magnetic tape has been completely loaded, the arm 76 is enforcedly held in a position in which the tension pin 70 is not yet in contact with the magnetic tape 4, as is shown by a solid line in FIG. 2. After the completed tape loading operation, the arm 76 is released from the above restrained state. Then, the tension pin 70 will bear on the led-out tape 4 to serve thereafter as the tension pin.

Figure 12A:
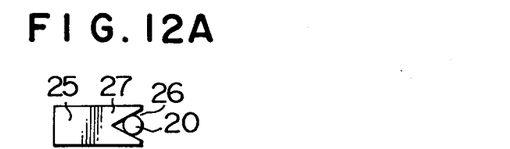
FIG. 12A is a top plan view showing schematically the tape lead-out mechanism and the stopper means in the state in which both are engaged with each other.
Figure 12B:
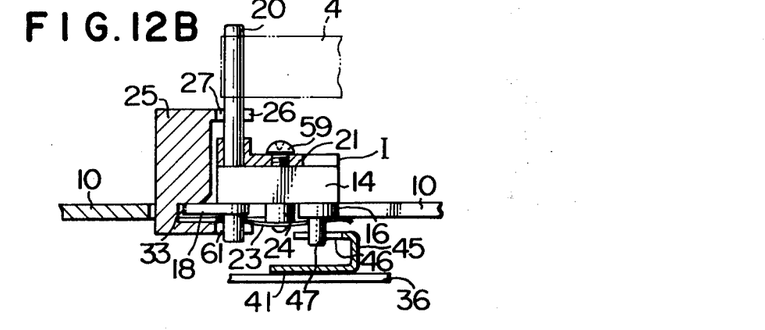
FIG. 12B is a partial sectional side view of the same.
Figure 12C:
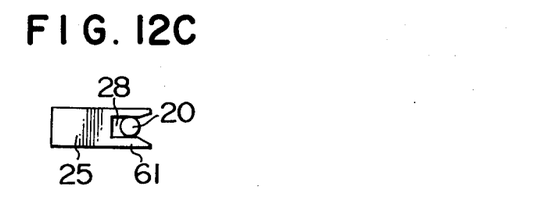
FIG. 12C is a schematic bottom plan view of the same.

Next, referring to FIGS. 12A, 12B and 12C, a description will be provided of the manner in which the magnetic tape lead-out mechanism I is positively brought into engagement with the stopper 25. As will be appreciated from the foregoing description, the tape lead-out mechanism I, is moved with the rotation of the loading ring 36 while the hub portion 16 slides in the guide groove 19 without chattering. Accordingly, the tape lead-out mechanism I will approach the stopper 25 as guided by the groove 19 and the vertical pin 20 will at first engage in the V-like notch 26 of the projection 27. At that time, the pin 20 will not undergo any lateral movements and be positively positioned at the center of the V-like notch since the vertical pin 20 has been stationarily positioned in the V-like notch 26. Under such a condition, any further force which causes the mechanism I to move upwardly can be suppressed by projection 18 of the tape lead-out mechanism I which will bear against the upper surface of the concave recess 33 formed in the stopper 25 sp as to be held at this position. The lower portion of the vertical pin 20 is then prevented from being moved laterally as it is snugly fitted in the U-like groove 28 formed in the lower projection 61. In this manner the vertical tape lead-out pin 20 is restricted at the end position of the groove 19 against movement in any direction by means of the cooperating V-like groove 26, U-like groove 28 and upper surface of the concaved portion 33, whereby the pin 20 is positioned correctly and precisely perpendicular to the plane of the base plate 10. Thus, in either operation of the recorder in the reproducing or the recording mode, the magnetic tape 4 is accurately placed in contact with the peripheral surface of the rotating head cylinder 13 by means of the vertical tape lead-out pin 20. The same will of course apply to the function of the other pin 20'.

When a button (not shown) for stopping the operation of the recorder is depressed, the tape unloading condition is set up, whereby the pins 20 and 20' are returned to and restored to the original positions.

We claim:
1. In a magnetic tape recording and reproducing device of the helical scanning type, apparatus for loading in said device a magnetic tape contained within a cassette comprising
a base plate;

a head cylinder mounted on said base plate and having a plurality of rotary heads associated therewith; and a pair of tape lead-out mechanisms provided at opposing sides of said head cylinder, said tape lead-out mechanisms comprising movable means movable along guide paths located on both sides of said cylinder and extending between a first position adjacent said head cylinder and a second position adjacent a cassette loaded in said device, a tape lead-out pin fixedly mounted on said movable means and having upper and lower portions, driving means for advancing and retarding said movable means along said guide paths, stopper means including
 first means including means for holding, in said first position, said movable means so as to prevent said movable means from further advancing beyond said first position,
 second means for preventing, in said first position, said movable means from moving in a direction substantially perpendicular to the plane including said base plate, and
 third means for preventing, in said first position, said movable means from moving in the plane substantially perpendicular to the advancing direction of said movable means, said first, second and third means being integrally incorporated as part of a stationary post and said guide paths consisting of arcuate guide grooves, and spring means for causing said movable means to abut against said base plate under resilient pressure thereby preventing said movable means from being disengaged from said guide grooves.

2. A tape loading apparatus as set forth in claim 1 wherein said lead-out pin fixed to said movable means engages the first and third means of said stopper means and a projection fixed to said movable means engages the second means of said stopper means.

3. A tape loading apparatus as set forth in claim 2 wherein said first means has a V-like recess for receiving therein said lead-out pin when said movable means comes to said first position.

4. A tape loading apparatus as set forth in claim 3 wherein the upper portion of said tape lead-out pin engages said V-like groove.

5. A tape loading apparatus as set forth in claim 2 wherein said second means is formed with a reference surface, and said projection is formed with a contacting surface with which said reference surface makes contact when said movable means comes to said first position, thereby preventing the movable means from moving in a direction substantially perpendicular to the plane including said base plate.

6. An apparatus as set forth in claim 5 wherein said second means comprises a concave recess for receiving therein said projection with the upper surface of said projection engaging the upper wall surface of said concave recess when said tape lead-out pin is received in said V-like recess.

7. A tape loading apparatus as set forth in claim 1 wherein said tape lead-out mechanism further comprises a correcting post mounted on said movable means, said correcting post ensuring that the magnetic tape led-out from said cassette defines a predetermined angle with respect to the central axis of said head cylinder when the magnetic tape is wound around said head cylinder.

8. A tape loading apparatus as set forth in claim 7 wherein said third means has a U-like recess for snugly receiving therein said lead-out pin.

9. A tape loading apparatus as set forth in claim 8 wherein the lower portion of said tape lead-out pin engages said U-like recess.

10. An apparatus as set forth in claim 1 wherein said first means has a V-like recess therein and said third means has a U-like recess therein, both of said means being simultaneously and positionally adjustable.

11. An apparatus as set forth in claim 1 wherein said guide grooves are formed in said base plate, said movable means being slidably disposed within said guide grooves.

12. An apparatus as set forth in claim 1 wherein said driving means comprises a rotary ring.

* * * * *